United States Patent Office 3,384,453
Patented May 21, 1968

3,384,453
PROCESS FOR PREPARING HIGHLY CRYSTAL-
LINE ALPHA STRONTIUM ACID PHOSPHATE
Herbert J. Kauders, Euclid, Ohio, assignor to General
Electric Company, a corporation of New York
No Drawing. Filed May 3, 1965, Ser. No. 452,915
5 Claims. (Cl. 23—109)

ABSTRACT OF THE DISCLOSURE

Highly crystalline alpha strontium acid phosphate ($\alpha$-SrHPO$_4$) can be produced by adding H$_3$PO$_4$ to an aqueous slurry of SrCO$_3$ or Sr(OH)$_2$ at a temperature in the range of about 75° C. to 100° C. The $\alpha$-SrHPO$_4$ is removed from the slurry, washed to remove residual reactants, and dried. Preferred concentrations are stated.

---

This invention relates to a method for the production of highly crystalline materials useful as intermediates in the production of fluorescent materials for lamps. More particularly, the invention relates to a method for the preparation of highly crystalline alpha strontium acid phosphate ($\alpha$-SrHPO$_4$).

Strontium acid phosphate is used as an intermediate material in the production of lamp phosphors, especially strontium orthophosphate and halophosphate phosphors used in electrical discharge lamps such as the commercially available 40-watt fluorescent lamps known as Deluxe Cool White and Deluxe Warm White. Strontium orthophosphate is used in the production of tin activated phosphors useful in deluxe lamps and high pressure mercury vapor lamps.

Previously known methods of manufacture of strontium acid phosphate are either slower than is commercially desirable or do not produce a high enough degree of crystallinity along with a narrow enough distribution range of particle sizes for optimum results. It is generally known that, in many phosphor systems, it is desirable to avoid overly fine particles that do not contribute significantly to light output. It is also known that a high degree of crystallinity is desirable. However, these factors are not obtained in the optimum commercial degree by previously known methods of producing strontium acid phosphate.

Strontium acid phosphate has, in the past, been considered to be a dimorphic material having a low temperature crystalline phase designated as beta ($\beta$) and a high temperature phase designated as alpha ($\alpha$). However, there is now reason to believe that the $\beta$-SrHPO$_4$ is not truly a different material from the $\alpha$-SrHPO$_4$, but is a hydrated form of the same material containing variable amounts of water.

For various reasons, it has been thought desirable to avoid $\beta$-SrHPO$_4$ in the production of lamp phosphors, and to use exclusively $\alpha$-SrHPO$_4$. Clusters or oversized particles formed with $\beta$-SrHPO$_4$ are undesirable and require comminution that can be harmful to phosphors produced.

Previously known processes for producing SrHPO$_4$ generally involve the use of ammonia or urea or a combination of the two with phosphoric acid in various forms such as monoammonium phosphate and diammonium phosphate. Urea gradually decomposes to give a continuous change in pH as its ammonia content is added to the reaction mixture. SrHPO$_4$ formed in the presence of ammonia at commercial speeds generally possesses one or more of several disadvantages including: the formation of small crystals, irregular particle size distribution, gelation which hampers separation, and the presence of more or less $\beta$-SrHPO$_4$.

It is an object of this invention to provide a new and useful process for the commercial production of $\alpha$-SrHPO$_4$ essentially free from variable or fixed amounts of water-of-crystallization and other undesirable impurities.

Another object of the invention is to provide such a process for producing $\alpha$-SrHPO$_4$ in a highly crystalline condition having a limited range of particle sizes.

Another object of the invention is to provide such a process for producing $\alpha$-SrHPO$_4$ which can be readily controlled to produce different desired particle sizes, each within narrowly defined ranges.

Still another object of the invention is to provide a process for producing $\alpha$-SrHPO$_4$ from a suspension, rather than from a solution in the presence of ammonia with its concomitant undesirable effects.

Briefly stated, the present invention provides a process for producing a highly crystalline $\alpha$-SrHPO$_4$ comprising the steps, in the stated order, of forming an aqueous slurry of a compound of strontium capable of reacting with phosphoric acid (H$_3$PO$_4$), reacting the compound in the slurry with H$_3$PO$_4$ to form crystalline $\alpha$-SrHPO$_4$, removing the $\alpha$-SrHPO$_4$ from the slurry, washing the $\alpha$-SrHPO$_4$ to remove residual reactants, and drying the $\alpha$-SrHPO$_4$. The preferred compounds of strontium for practicing the process of the invention are strontium carbonate (SrCO$_3$) and strontium hydroxide (Sr(OH)$_2$). The hydrated form, Sr(OH)$_2 \cdot$8H$_2$O, is equivalent to Sr(OH)$_2$ for these purposes. Also, the reaction is preferably carried out in an aqueous slurry containing about 1 to 26.5% by weight SrCR$_3$ (preferably 8 to 13%) in a temperature range of 75 to 100° C., or preferably 80 to 90° C. The H$_3$PO$_4$, as added, may have a concentration of about 10 to 85%, or preferably about 75%. This refers to the concentration of the acid being added, not in the slurry. Since the effect of stirring is determined largely by the shape of the reaction vessel and other factors, it would be difficult to specify preferable stirring rates in specific terms. Deionized water is preferred for the slurry to avoid impurities.

Several variable factors interact to affect the results of the crystallization process. These include: rate of stirring, temperature, rate of addition of H$_3$PO$_4$, concentration of the aqueous SrCO$_3$ slurry, and concentration of the H$_3$PO$_4$. The rate and amount of effervescence of CO$_2$ from the slurry on decomposition of SrCO$_3$ may have an effect on the reaction rate and size of the crystals. This effervescence contributes a mixing effect which can be further enhanced by mechanical stirring. Generally, a lower rate of agitation and lower temperature result in a coarser product; conversely, a faster rate of stirring and higher temperature result in finer crystals. At lower temperatures such as 82° C., the rate of stirring is of greater importance than at higher temperatures such as 88° C.

The reaction starts immediately upon addition of H$_3$PO$_4$ and is endothermic. A slight excess of acid at the end of the reaction is beneficial. At 70° C. and lower temperatures, up to 50% of the crystallizing material is the undesired $\beta$-SrHPO$_4$. At 75° C. and higher, $\alpha$-SrHPO$_4$ is obtained. At the lower temperatures within the range of the invention, the rate of addition of H$_3$PO$_4$ is important, in that doubling the addition time results in significantly larger crystals in, for example, a 10% by volume slurry of $SrCO_3$. Both the digestion time and degree of dilution of the phosphoric acid have little if any influence on crystal size itself, but can be important economic factors in commercial utilization of the process.

In addition to the carbonate and hydroxide, other compounds of strontium can be used in the present invention. However, economic considerations presently make $SrCO_3$ the preferable starting material. In order to form the slurry, the starting material of these reactions must not be very soluble in water. Since other processes are available for producing the desired barium and calcium acid phosphates used in phosphor manufacture and elsewhere, the present reaction might not be economically as desirable for use with barium and calcium as it is with strontium. My results to date indicate that processes analagous to the present invention are more useful with barium than with calcium.

Since phosphates produced according to the present invention have fewer undesirable fines and oversized particles that would tend to cause lower brightness in resulting phosphors, expensive air classifying to get rid of such fines and grinding to eliminate the oversized particles are unnecessary. The absense of the undesired fine particles also aids in achieving better light maintenance over the lives of lamps using phosphors produced from phosphates made according to the present invention.

Now that the invention has been described, examples will be given of its use to further demonstrate the practice of the invention.

Example I (1) 300.0 g. $SrCO_3$ having an average Fisher Sub-Sieve particle size of about $1\mu$ were suspended in 2700.0 ml. of deionized water, and the slurry was agitated at 100 r.p.m. in an open, stainless steel, steam jacketed vessel.

(2) The slurry was heated to a temperature of 82° C.

(3) 176.0 ml. of 75% $H_3PO_4$ were added at a rate of 8.83 ml. per minute.

(4) After complete addition of the $H_3PO_4$, the precipitate was stirred for a period of 40 minutes at 82° C.

(5) The product was filtered, washed, and dried in an oven at 110–140° C.

The recovered material was highly crystalline $\alpha$-$SrHPO_4$ having an average particle diameter of $4.4\mu$ as determined by a Fisher Sub-Sieve Sizer. The yield of this example was 360 grams or 96.8% of theoretical value.

Example II (1) 500.0 g. of $SrCO_3$ were suspended in 2700.0 ml. of deionized water, and the slurry was agitated at 150 r.p.m. in an open, stainless steel, steam jacketed vessel.

(2) The slurry was heated to a temperature of 88° C.

(3) 280.0 ml. of 75% $H_3PO_4$ were added at a rate of 14.0 ml. per minute.

(4) After complete addition of the $H_3PO_4$, the precipitate was stirred for a period of 30 minutes at 88° C.

(5) The product was filtered, washed, and dried in an oven at 100–140° C.

The recovered material agains was highly crystalline $\alpha$-$SrHPO_4$, this time having an average particle diameter of $3.8\mu$. The yield of this example was 570 grams or 98.0% of theoretical value.

Example III (1) 300.0 g. of $SrCO_3$ were suspended in 2700.0 ml. of deionized water, and the slurry was agitated at 60 r.p.m. in an open, stainless steel, steam jacketed vessel.

(2) The slurry was heated to a temperature of 85° C.

(3) 175.0 ml. of 75% $H_3PO_4$ were added at a rate of 9.0 ml. per minute.

(4) After complete addition of the $H_3PO_4$, the precipitate was stirred for a period of 60 minutes at 85° C.

(5) The product was filtered, washed, and dried in an oven at 110–140° C.

This time the recovered material had an average particle diameter of $7.0\mu$, and a yield of 365 grams or 98.4% of theoretical value.

Example IV (1) 96.0 g. of $Sr(OH)_2 \cdot H_2O$ (strontium hydroxide octahydrate) were suspended in 300 ml. of deionized water and the slurry was agitated at 100 r.p.m. in an open, stainless steel, steam jacketed vessel.

(2) The slurry was heated to a temperature of 100° C.

(3) 77.8 ml. of 50% phosphoric acid were added at a rate of 7.2 ml. per minute.

(4) After complete addition of the phosphoric acid the precipitate was stirred for a period of 120 minutes at 95–98° C.

(5) The product was filtered, washed, and dried in an oven at 110–140° C.

The recovered material was highly crystalline $\alpha$-$SrHPO_4$ with an average particle diameter of $3.8\mu$ as determined by a Fisher Sub-Sieve Sizer. The yield was 61.0 grams or 91.8% of theoretical value.

Example V

A larger quantity of $\alpha$-$SrHPO_4$ has been prepared using the following procedure:

(1) 2700 liters of deionized water were loaded into a steam jacketed reactor.

(2) 300.0 kg. of $SrCO_3$ were added to form an aqueous slurry.

(3) The speed of agitation was 105 r.p.m.

(4) The material was heated to 88.0° C. and the temperature controlled to $\pm 0.2°$ C.

(5) 176.0 liters of 75% $H_3PO_4$ were pumped into the reactor at a rate of 5.0 liters per minute.

(6) After complete addition of the $H_3PO_4$, the contents of the reactor were stirred for a period of 30 minutes at 88° C.

(7) Stirring and heating were discontinued, and the solid precipitate allowed to settle.

(8) The precipitate was centrifuged, washed, and dried.

The average particle diameter of $SrHPO_4$ was $3.8\mu$, and the 334.0 kilogram recovery amounted to 89.5%.

Increased luminous efficiency in electric discharge lamps resulting from the use of product produced according to the invention is due, in part, to both the ability to coat heavier layers of phosphor in lamp tubes by conventional coating techniques and the narrower particle size distribution of the phosphor.

While specific examples have been given of preparation of $\alpha$-$SrHPO_4$, it will be understood that various changes, omissions and substitutions may be made within the true spirit and scope of the invention as defined in the appended claims.

What I claim as new and desire to secure by Letters Patent of the United States is:

1. A process for producing highly crystalline $\alpha$-$SrHPO_4$ comprising the steps, in the stated order, of forming an aqueous slurry of a compound selected from the group consisting of $SrCO_3$ and $Sr(OH)_2$, adding $H_3PO_4$ to said slurry to form crystalline $\alpha$-$SrHPO_4$ at a temperature in the range of about 75° C. to 100° C., removing said $\alpha$-$SrHPO_4$ from said slurry, washing the $\alpha$-$SrHPO_4$ to remove residual reactants, and drying the $\alpha$-$SrHPO_4$.

2. The process of claim 1 in which the strontium compound reacting with $H_3PO_4$ is $SrCO_3$.

3. The process of claim 1 in which the strontium compound reacting with $H_3PO_4$ is $Sr(OH)_2$.

4. A process for producing highly crystalline $\alpha$-$SrHPO_4$ comprising the steps, in the stated order, of forming an aqueous slurry of about from 1 to 26.5% by weight $SrCO_3$, reacting said $SrCO_3$ with $H_3PO_4$ having a concentration of about 10–85% at a temperature of about from 75 to 100° C., removing the α-SrHPO$_4$ from said slurry, and washing and drying the α-SrHPO$_4$.

5. A process for producing highly crystalline α-SrHPO$_4$ comprising the steps, in the stated order, of forming an aqueous slurry of about from 8 to 13% by weight SrCO$_3$, reacting said SrCO$_3$ with H$_3$PO$_4$ having a concentration of about 75% at a temperature of about from 80 to 90° C., removing the α-SrHPO$_4$ from said slurry, and washing and drying the α-SrHPO$_4$.

References Cited

UNITED STATES PATENTS

| 3,065,053 | 11/1962 | Aia | 23—109 |
| 3,068,067 | 12/1962 | Aia | 23—109 |
| 3,113,835 | 12/1963 | Aia | 23—109 |

MILTON WEISSMAN, *Primary Examiner.*

L. A. MARSH, *Assistant Examiner.*